US006538709B1

(12) United States Patent
Kurihara et al.

(10) Patent No.: US 6,538,709 B1
(45) Date of Patent: Mar. 25, 2003

(54) LCD PANEL INCLUDING PLURALITY OF DISPLAY PANEL PARTS WRAPPED AROUND BY A THIN PLASTIC FILM ENVELOPE WITH AN OPENING

(75) Inventors: Mikio Kurihara, Yamato (JP); Yasuhiro Kimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/212,953

(22) Filed: Dec. 15, 1998

(30) Foreign Application Priority Data

Feb. 17, 1998 (JP) ............................................. 10-034674

(51) Int. Cl.⁷ ..................... G02F 1/1333; G02F 1/1335; G02F 1/16; G06F 1/16
(52) U.S. Cl. ............................ 349/58; 349/56; 349/65; 361/681
(58) Field of Search ...................... 361/681; 364/708.1; 349/56, 58, 65

(56) References Cited

U.S. PATENT DOCUMENTS

| 4,221,112 A | * | 9/1980 | Enomoto et al. | ............... | 349/58 |
| 5,119,204 A | * | 6/1992 | Hashimoto et al. | ........... | 349/58 |
| 5,659,376 A | * | 8/1997 | Uehara et al. | ................. | 349/58 |
| 5,729,310 A | * | 3/1998 | Horiuchi et al. | ............... | 349/58 |
| 5,847,782 A | * | 12/1998 | Imazeki et al. | ................ | 349/56 |
| 5,946,061 A | * | 8/1999 | Kurihara et al. | ............... | 349/58 |
| 6,055,029 A | * | 4/2000 | Kurihara et al. | ............... | 349/65 |
| 6,128,183 A | * | 10/2000 | Uchiyama et al. | ........... | 361/681 |

FOREIGN PATENT DOCUMENTS

| JP | 61-129623 | * | 6/1986 | |
| JP | 4-291320 | * | 10/1992 | .................. 349/158 |
| JP | 5-173103 | * | 7/1993 | ................... 428/13 |
| JP | 6-34958 | * | 2/1994 | |
| JP | 6-130342 | * | 5/1994 | .................. 349/84 |
| JP | 6-148664 | * | 5/1994 | |
| JP | 7-222245 | | 8/1995 | ............ H04Q/7/38 |
| JP | 8-262438 | * | 10/1996 | |
| JP | 10-221686 | * | 8/1998 | |
| JP | 11-239176 | | 8/1998 | ............ H04L/12/56 |

* cited by examiner

Primary Examiner—William L. Sikes
Assistant Examiner—Tarifur R. Chowdhury
(74) Attorney, Agent, or Firm—Marian Underweiser

(57) ABSTRACT

A liquid crystal display panel part group composed of a plurality of panel parts such as an array cell, a optical system sheet family, a light guide plate, a lamp reflector, and a lamp, and a liquid crystal display panel is enveloped in a film for laminating the parts. This film may be provided so as to cover the whole of the liquid crystal display panel part group and the film may have an opening. In order to adjust the positions of the parts, convex and concave portions are provided in the liquid crystal display panel parts.

24 Claims, 6 Drawing Sheets

LCD PANEL INCLUDING PLURALITY OF DISPLAY PANEL PARTS WRAPPED AROUND BY A THIN PLASTIC FILM ENVELOPE WITH AN OPENING

FIELD OF THE INVENTION

The present invention relates to a structure of a liquid crystal panel and a liquid crystal display device to a manufacturing method, more particularly it relates to a liquid crystal panel which is built into portable electronic appliances such as notebook type personal computers.

BACKGROUND OF THE INVENTION

As shown in FIG. 1, the liquid crystal display panel generally has a structure in which liquid crystal display parts such as a lamp reflector 4; an optical guide plate 6; an optical system sheets 8 (like a light collection sheet and light diffusion sheet); and an array cell 10 are stacked on the frame 2. A lamp 12 is attached to the panel, and the parts are affixed to each other by a front bezel 14 formed of metal or plastic. The front bezel 14 is fixed to the frame 2 by a screw or by inserting a bent portion of its flange. Alternately, the parts are assembled with a rear bezel (not shown) onto the opposite side of the frame 2 to the front bezel 14, and the parts from the frame 2 to the array cell 10 are arranged between the front and rear bezels.

Japanese Patent Application Laid Open No. Hesei 7-159,779 discloses a mounting method of a liquid crystal display panel in which a liquid crystal display panel is placed on the upper surface of a back light employing light emission diodes and four corners of the back light and four corners of the liquid crystal panel using a film substrate are subjected to heat to elevate the temperature higher than their melting temperature while subject to pressure whereby both are welded fixedly to each other. Since no fixing members are needed especially, reductions in total weight and thickness of the device and the number of components can be achieved.

Japanese Patent Application laid Open No. Heisei 4-246620 discloses a manufacturing method of a light adjustment liquid crystal panel in which transparent plates are stacked interposing an adhesion sheet on both surface of the liquid crystal sheet. A stacking unit composed of the transparent plates is put in an air bag, and this unit is heated to more than a softening point or a melting point of the adhesion sheets while sucking and exhausting the air from the bag. The liquid crystal sheet and the transparent plate are pressed to each other and united at a low temperature, quickly and at low pressure, with the result that deterioration of the resin matrix in the liquid crystal layer and warp and distortion of the transparent plate are prevented. Moreover, since moisture is removed during heating in vacuum, blistering does not usually occur.

Subject to be Solved by the Invention

Recent years, the demand for note-book type personal computers has been significantly increased from viewpoint of use of the personal computers outside of offices and saving-space. The high performance of miniaturization of the other parts have increased the demand for reduction in thickness and weight of the liquid crystal display panels serving as displays for the computers.

However, in order to attach the members for use in the liquid crystal display panel to each other using the above-described front bezel with requisite force requires frames and front bezels having a certain degree of thickness and weight. When the molding workability of plastics and the sheet metal workability of metals are considered, the thickness of the frame and the front bezel is about 0.5 to 1 mm at the minimum. For the whole of the liquid crystal display panel, a thickness of about 1 to 2 mm is needed merely to fix the members to each other. The liquid crystal display panel is constructed by stacking the front bezel 14, the array cell 10, the optical system sheet tribe 8, the light guide plate 6, the lamp reflector 4, and the frame, resulting in a considerable thickness of the liquid crystal display panel. Depending on circumstances, a rear bezel may be stacked on the frame 2. There are a large number of liquid crystal display panels that have been manufactured as products having thicknesses less than 10 mm. Therefore, the 1 to 2 mm required to fix the members together is considerable. Moreover, since a front bezel made of metal is heavy hindering a reduction in weight of the liquid crystal display panel.

Fixing the members of the liquid crystal display panel employing the front bezel together requires time consuming fitting and/or bending operations. Automatic operations in assembly steps, therefore, tend to be complicated using a large number of steps. Since it is difficult to automatize on the manufacturing lines, using a front bezel is not desirable from the viewpoint of facilitation in assembling the members of the panel.

Moreover, portable electronic appliances are expected to be used under a variety of circumstances, and they are often used in the outdoors and other environments where dust and dirt exists. Atmospheric electricity and the like cause liquid crystal display panel members to adsorb the dust and the dirt, resulting in malfunctions and imperfect image rendering. White spot or black spot defects may occur on the liquid crystal screen under certain circumstances. During use, high temperature coffee may be spilled on the display screen. As a result, the display performance of the liquid crystal display panel might be degraded by water and heat. Moreover, besides the environment these appliances are placed by water and used, it is also necessary to consider the manufacturing environment. Specifically, all of the steps of manufacturing are not always performed in the same factory and manufacturing steps are sometimes conducted in different countries. In cases where sea transport occurs, it is necessary to take the contamination from salt contained in the air into account. Therefore, it is necessary to take counter measures for the salt in the transportation of the products.

Therefore it is an object of the present invention to provide a thin, lightweight a liquid crystal panel where the members of the liquid crystal display panel are assembled without the use of a front bezel and the like.

Another object of the present invention is to provide a method to significantly simplify assembly steps by putting together the members of the liquid crystal display panel without using a front bezel and the like.

Still another object of the present invention is to provide a liquid crystal display panel which has excellent water resistance, dust resistance and salt resistance.

Still a further object of the present invention is to provide a method to perform the positioning of the components of a liquid crystal display panel at time of assembly.

Still further object of the present invention is to provide a method to attach the member of the liquid crystal display panel put together into a unit cover of a liquid crystal display device.

BRIEF DESCRIPTION OF THE INVENTION

In accordance with the present invention, a liquid crystal display panel part group, composed of a plurality of liquid crystal display panel parts, has a pair of films which are laminated to the liquid crystal display panel parts to hold them together. The liquid crystal display panel part group comprises at least two kinds of liquid crystal display panel parts selected from a group composed of an array cell panel, an optical sheet family, a light guide unit, a lamp reflector, and a lamp. The films binding liquid crystal display panels together can be provided with an opening for exposing the face of the array panel and have through holes for attachment to other parts of the display, such as a cover. Positioning elements are provided to facilitate correct assembly of the parts of the panel part group in the plastic films

DETAILED DESCRIPTION OF THE PREFERRED EMBODIMENTS

Figure 1:
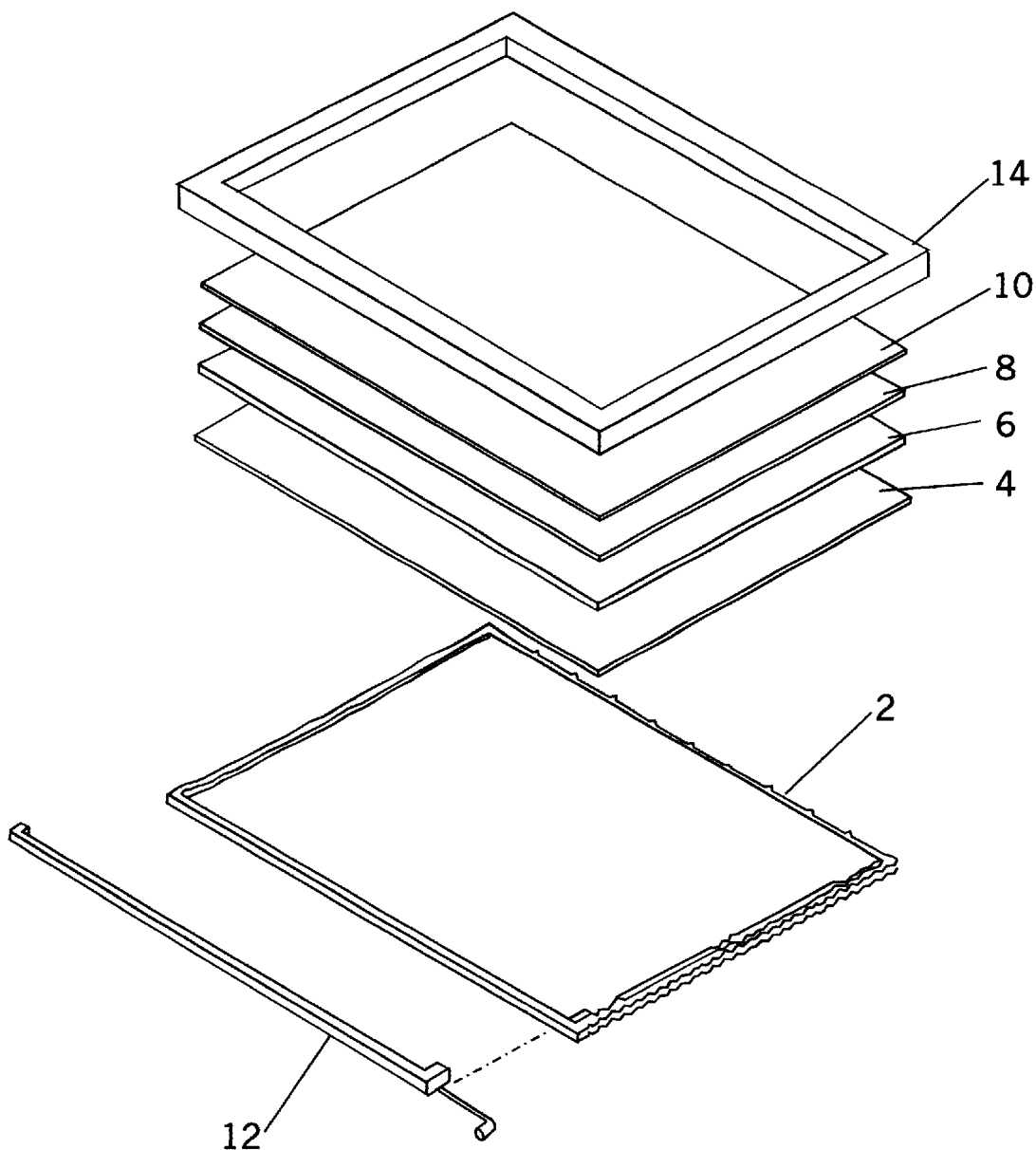
FIG. 1 is a perspective view showing the assembly of a liquid crystal display panel part group in the prior art.
Figure 2:
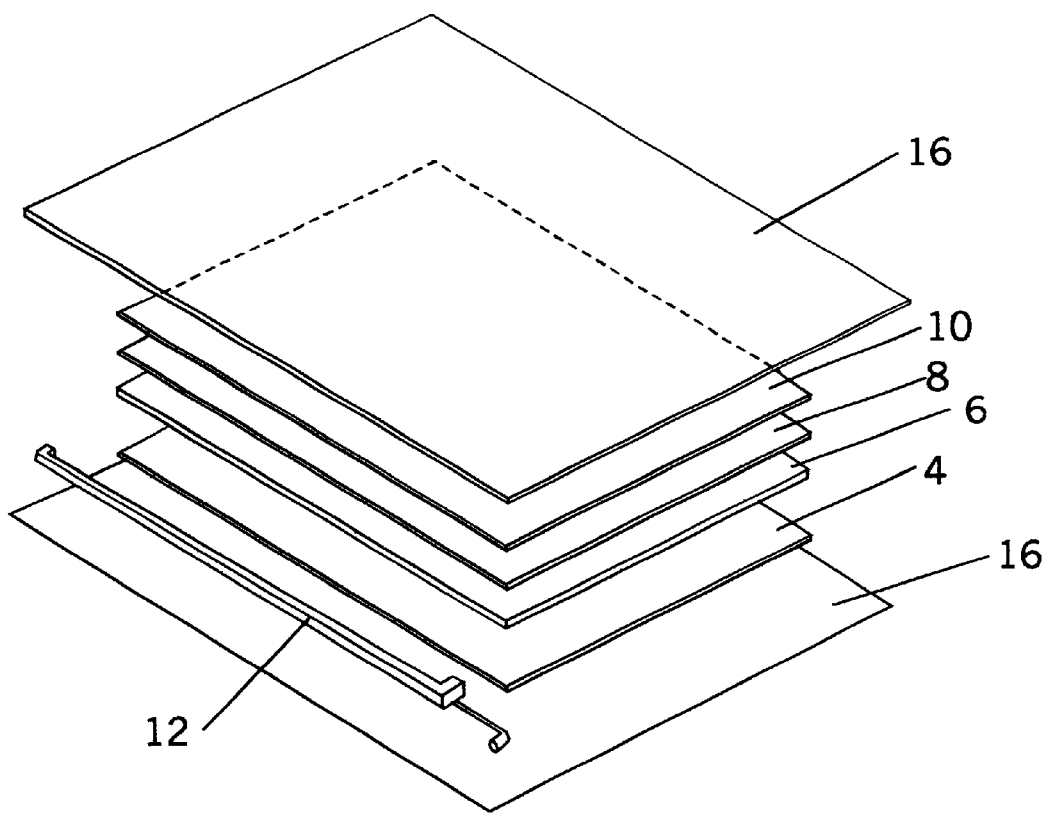
FIG. 2 is a perspective view showing an assembly of a liquid crystal display panel part group in accordance with the present invention.

An embodiment of the present invention will be described with reference to FIG. 2. Liquid crystal display panel parts have a structure in which an array cell 10 formed of glass is mounted on a backlight unit composed of the lamp reflector 4, the light guide plate 6, the optical system sheet family 8, and the lamp 12. The whole of the liquid crystal display panel parts (hereinafter referred to as a liquid crystal display panel part group), in which all parts constituting the group is enveloped by plastic film 16 so that the liquid crystal display panel part group may be concealed from upper and lower sides thereof by a pair of plastic films 16. Each part of the liquid crystal display panel part group is attached fixedly to another by utilizing the adhesion of the plastic films.

When the parts of the liquid crystal display panel part group are laminated, an image display section is also covered with the plastic films. Therefore, the plastic films should be transparent, besides being heat resistant, water resistant, smooth, tough, fire resistant and nontoxic. Specifically, a base material such as polyethylene terephthalate, polybutylene terephthalate, polyethylene naphthalate, polyimide, polyamide, polycarbonate, polyvinyl chloride, polyethylene, polypropylene and polystyrene can be employed. A thickness of the base material should preferably be 30 to 500 m, more preferably 30 to 300 m, and still more preferably 30 to 180 m.

For a first method that allows plastic films to possess an adhesion property, an adhesive film-like material can be employed, on which a sticky material exhibiting stickiness at a room temperature is previously applied onto one surface of the plastic film. An example of sticky materials are cellulosic materials, alkyd, ester acrylate, polyamide, polystyrene, synthetic rubber, polyvinylalcohol, polyvinylacetate, and cyanoacrylate.

For a second method that allows the plastic films to possess an adhesion property, a high temperature adhesive film-like material can be employed, on which a material is previously applied onto one surface of the plastic film. This material exhibits no stickiness at a room temperature and is melted by heating to a high temperature to thereby exhibit stickiness. By heating, the materials coated on the adhesion surfaces of both plastic films contacting with each other are melted and adhered to each other, or the material coated on the adhesion surface of the plastic film contacting with the liquid crystal display panel part group is melted and adhered thereto. Thereafter, the temperature of the materials is restored to room temperature, whereby the adhesion surfaces of the plastic films are fixed to each other or the adhesion surface of the plastic film is fixed to the liquid crystal display panel part group. Thus, the whole parts of the liquid crystal display panel part group can be tightly fastened to each other. Examples of the high temperature adhesion materials are polyester resin, acrylic resin, polyamide resin, vinylchloride resin, cellulosic resin, epoxy resin, and wax.

Methods of applying the foregoing sticky material and the foregoing high temperature adhesive material onto the plastic films may be one arbitrarily selected among gravure coating, extrusion coating, screen printing, roll coating and others. Any thickness of the sticky material to be applied may be satisfactory as long as an enough adhesion strength can be obtained. Preferably, it should be 5 to 100 m thick and more preferably 10 to 50 m thick.

For heating, any means may be satisfactory as long as it can be kept at a high temperature continuously for a certain period of time. A pressure may be applied between the plastic film and the liquid crystal display panel part group during heating operation so that the plastic film and the liquid crystal display part group should be closely attached to each other. Application of the pressure makes it possible to purge the air existing between the plastic film and the liquid crystal display panel part group, and therefore an adhesive strength after heating can be sufficiently enhanced. Moreover, it is possible to avoid occurrences of disadvantages that a lack in the adhesion and a failure of the exterior appearance of the liquid crystal display panel are caused because of residual bubbles. For the method to heating while applying the pressure, the ones using heating rolls and heating stumpers are included. However, the method is not necessarily limited to these.

Although the heating conditions are decided depending on the kind of the sticky material, it must be within the range that it has no adverse effect on the liquid crystal display panel part group, especially the color filter. The heating temperature should be 70 to 200.

It may be acceptable that the base material of the plastic film itself melts at a high temperature and exhibits an adhesion property. Materials of the plastic film having the base material itself which exhibits the adhesion property are polyethylene, polypropylene, nylon, polyester, vinyl chloride and the like are included. Furthermore, using a film that contracts by heating, a shrink lapping film, the liquid crystal display panel part group can be covered with this film by lamination of the film.

In the present invention, the word laminationor laminate means the procedures performed in such manner that the plurality of liquid crystal display panel parts are positioned and assembled, and the liquid crystal display panel part group obtained by assembling the liquid crystal display panel parts is covered or enveloped by the plastic film partially or entirely, thereby fixing the parts each other. In order to bind them together, it is possible to utilize various kinds of properties possessed by the plastic film. For example, any property such as stickiness of plastic films or a material coated on the plastic films at a room temperature and a high temperature, contractility of the plastic films at a high temperature environment, and elasticity of rubber family plastic films at a room temperature can be utilized as long as the properties of the plastic films have abilities to fix the liquid crystal display panel part group thereto.

For an example of the above described heating and pressure-application means, laminating means by a so-called pouch is included. There is the possibility that materials used widely as the pouches and processing apparatuses for the pouches can be employed to achieve the objects of the present invention. For example, concerning the processing apparatus for use in the pouch sheet, lamination package series made by Fuji Tech Co., Ltd. and MIDI-LAM series and lamination-pro series made by Nihon G.P.C. Co. Ltd, have been on the market and various kinds of pouch sheet fitted to these processing apparatuses are also available.

In order to enhance the adhesion between the plastic film and the liquid crystal display panel part group (in addition to applying the pressure between the plastic film and the liquid crystal display panel part group), the pressure at the environment around the plastic film and the liquid crystal display panel group can be made lower than in the atmospheric pressure so that the air existing between them is adsorbed. For example, the liquid crystal display panel part group can be put in a bag-shaped plastic film where the bag is closed except for the portion serving as a port, and then the air is exhausted from the port to the outside. With the adoption of this method, the liquid crystal panel display part group can be enveloped by the plastic film in a state where the potential of adhesion of the plastic film to the liquid crystal display panel part group is high. Moreover, the air existing between the plastic film and the liquid crystal display panel part group is absorbed where they are put in a heating oven, after the absorption of the air is completed, where the liquid crystal display panel part group enveloped with the plastic film is put in the heating oven, it further enhances the adhesion of the plastic film to the liquid crystal display panel part group. Occasionally when employing a heated roll, when the total thickness of the members passing through the heating roll exceeds 10 mm, sufficient adhesion strength cannot be provided because of variations in temperature and pressure. However, where the above described absorption method is tried to laminate the liquid crystal display panel part group having a total thickness of 10 mm or more with the plastic film, the examination is successful.

Various methods of the lamination are described below using a plastic film which has one surface coated with a high-temperature adhesive material. In the first such method, two plastic films 16 having a size larger than the liquid crystal display panel part group are prepared as shown in FIG. 2 and the liquid crystal display panel part group is put between the two plastic films 16, which are respectively placed on both the upper side and underside of the liquid crystal display panel part group. The underside surface of the plastic film placed over the upper side of the liquid crystal display panel part group and the upper side surface of the plastic film placed under the underside thereof serve as the surfaces onto which the adhesive is coated. Successive laminations can be performed by using two plastic film rolls. Plastic films are sequentially sent out from both of the rolls. The plastic film are laminated on both sides of the liquid crystal display panel part group and then the plastic films are cut. Moreover, a plastic film is laid on top of another plastic film so that their adhesive surfaces contact each other and then only one side edges of the plastic films may be adhered to each other by several mm to about 20 cm by a thermal contact bonding, whereby a film set for use in the lamination, in which the two plastic films are paired, can be previously prepared. The liquid crystal display panel part group is put between the two films composed of the film set for use in the lamination, and the whole of the resultant structure is subjected to the thermal contact bonding. Hence, a lamination operation efficiency can be significantly enhanced.

A second method for enveloping the liquid crystal display panel part group is to use a plastic film which is more than twice that of the liquid crystal display panel part group. The plastic film is folded in two so that adhesive surfaces face each other, and the liquid crystal display panel part group is put between the adhesive surfaces. In any of the first and second methods, the following procedures may be conducted. Specifically, the liquid crystal display panel part group is enveloped by the plastic films, and then heated without any processing after enveloping the liquid crystal display panel part group. Another way is to envelope the liquid crystal display panel part group by the plastic films so that the outer peripheries of the upper and lower plastic films are adhered to each other by heating or the like. After the liquid crystal display panel group is enveloped in a bag with either an opened port or a closed port, the whole is subjected to heating or the like, whereby the plastic films and the liquid crystal display panel group are fixed to each other.

In the case where end portions of the plastic films are fixed by adhering them to each other, adhesive coated surfaces of the sheets may be adhered each other or an adhesive coated surface of the end portion of one sheet and non-adhesive coated surface of the end portion of the other sheet may be adhered to each other. In the case of the lamination using two plastic film as shown in FIG. 2, all the plastic films must be a size larger than the liquid crystal display panel part group. If an adhesive coated surface of one plastic film is adhered to a non-adhesive coated surface of the other plastic film, as long as a size of one plastic film is sufficiently larger than the liquid crystal display panel part group. They can be adhered to each other even if the other plastic film is smaller in size than the liquid crystal display panel group.

Figure 3:
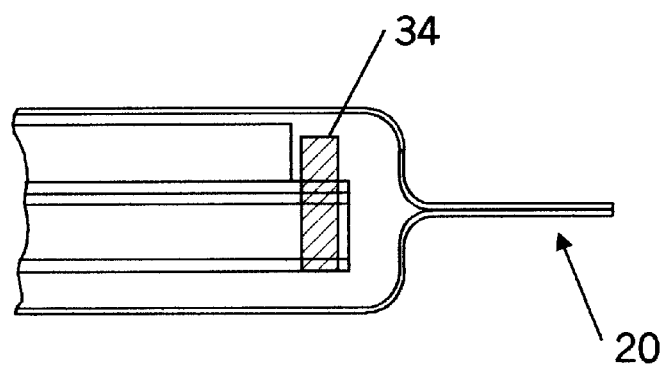
FIG. 3 is a sectional view showing a laminated liquid crystal display panel.

By selecting the above described methods for adhering the plastic films, a portion serving as an overlap margin can be arbitrarily created in an end edge portion of the liquid crystal display panel group and vise versa. In FIG. 3, two plastic films having a sufficiently large size are laminated so as to create an overlap width 20. If it is desired that a size of a liquid crystal display image screen is as large as possible, the films should be adhered to each other so that no overlap width may be created. After adhering, cutting can be also performed so that the overlap portion 20 can be reduced to a suitable size.

Figure 4:
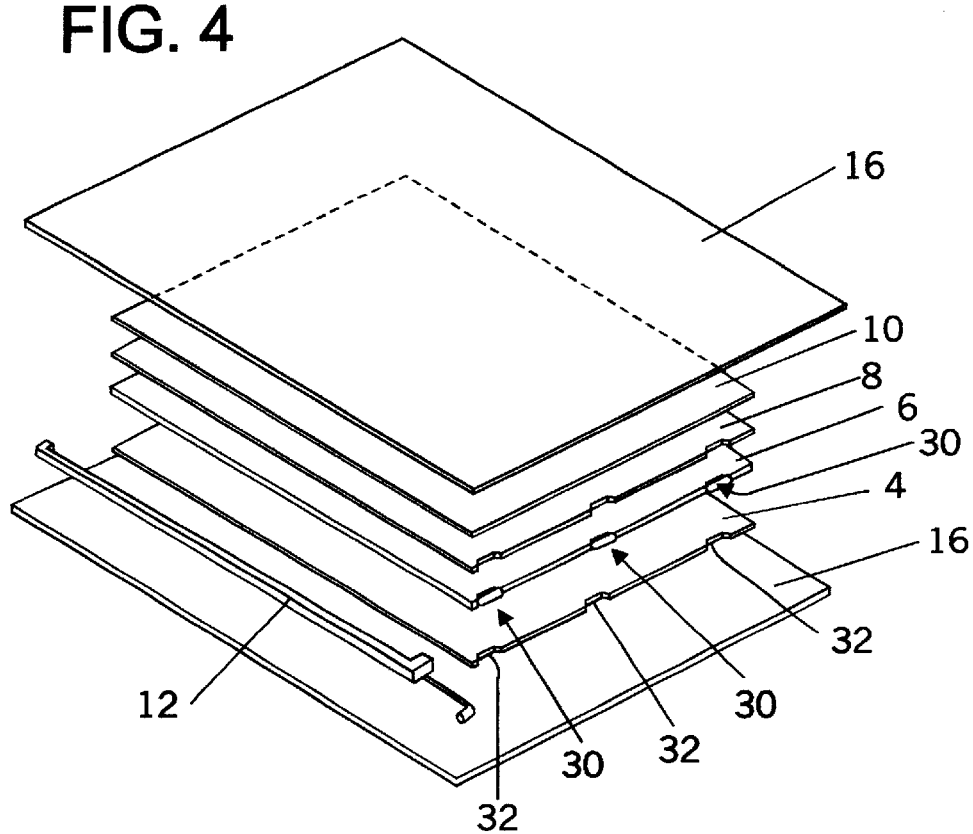
FIG. 4 is a perspective view showing an assembly of parts of the liquid crystal display panel part group of the present invention.

In the conventional assembling method using front bezels, if the array cell, the light guide plate and the like are made to fit the frame, it was possible to easily position the array cell, the light guide plate and the like. Since the frame and the front bezel are not used in the present invention, some contrivance is needed to position them. A positioning method which has no adverse affect on the heating and pressuring process in the lamination step for the plastic film, is to use a convex and a concave portions in the liquid crystal display panel parts. As shown in FIG. 4, the convex portions 30 are provided on the one side of the light guide plate 6 and concave portions 32 are provided in the lamp reflector 4 and the optical system sheet 8. The positioning can be performed by fitting the convex portions 30 of the light guide plate in the concave portions of the other parts. Positional shifts are liable to occur during the heating and pressuring processing for the films. The positioning method using the projections is very effective in preventing such positional shifts during processing.

The convex and concave portions may be arbitrarily formed in any part of the liquid crystal display panel group, and it is satisfactory that the concave portions may be formed simply by cutting the corresponding portion of the part. The convex portions must be formed with a projecting positioning section and must be sufficiently rigid. From a viewpoint of a strength and a workability of a material, it is most preferable that the light guide plate should have the convex portions and other parts should have the concave portions.

Figure 5:
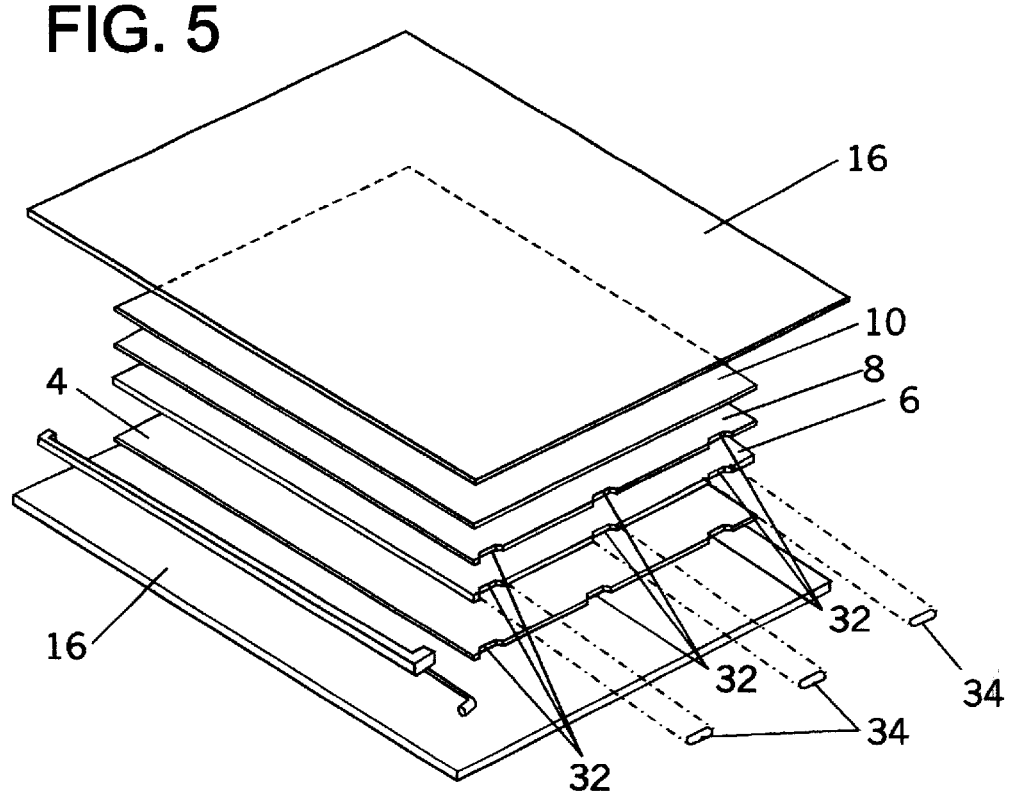
FIG. 5 is a perspective view showing an assembly of parts of a liquid crystal display panel part group of the present invention.
Figure 6:
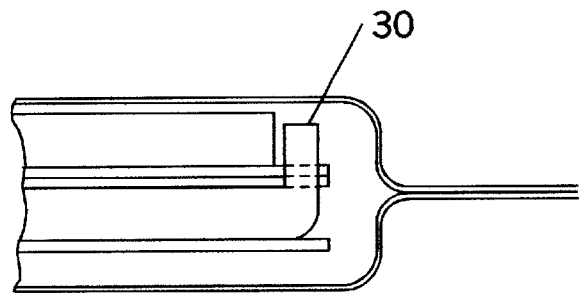
FIG. 6 is a sectional view showing a laminated liquid crystal display panel.

However, this is not a limiting factor in the structure of the liquid crystal display panel. As shown in FIG. 5, the concave portions may be provided in all parts and positioning parts 34 may be added and fitted into the corresponding concave portions 32 to fix the structure. In the case where the positioning part are added, as well as in the case where the convex portions are formed in the light guide plate, the positioning part and the convex portion should preferably have the minimum size so as not to protrude from the liquid crystal display panel group when the parts of the liquid crystal display panel part are integrated. FIGS. 3 and 6 show the situations where the positioning part 34 and the positioning section are formed so as not to increase the thickness of the liquid crystal display panel part group. It is satisfactory that the above described positioning means is formed so that the parts of the liquid crystal display panel part group can be easily positioned by fitting the positioning part in the concave portion. The shapes of the convex and concave portions in addition to the shape of the positioning part is not limited to those shown in the drawings. For example, they may be any shape such as a rectangular solid, a solid body, a plate, a stick, a cone, a truncated cone, a polygonal cone, a sphere, a disk, a ring, a feather shape (magic tape and the like ), a hock, a U-character shape, a horseshoe, a turned U-shape sideways, a clip, a slit, and shapes which are adaptations of these shapes.

In the plastic film laminate, an open portion or a "window" where there is no film, can be provided. Alternately, when the ends of the films are adhered they may be arranged so that one part of the liquid crystal display panel part group is not covered with plastic films. Moreover, a non-adhered portion may be left, where the ends of the films contact with each other and not adhered because they are not heated yet. By providing such window, parts for transmitting signals and a power source between the determined parts of the liquid crystal display panel part group and the outside can be passed through the window. For example, cables for a power source, a ground, signals against TABs, and cables for a power source for use in a backlight, and TAB itself are passed through this window to the outside. After the cables and the like are taken out through the window, the non-adhered portions may be adhered by heating.

Figure 7:
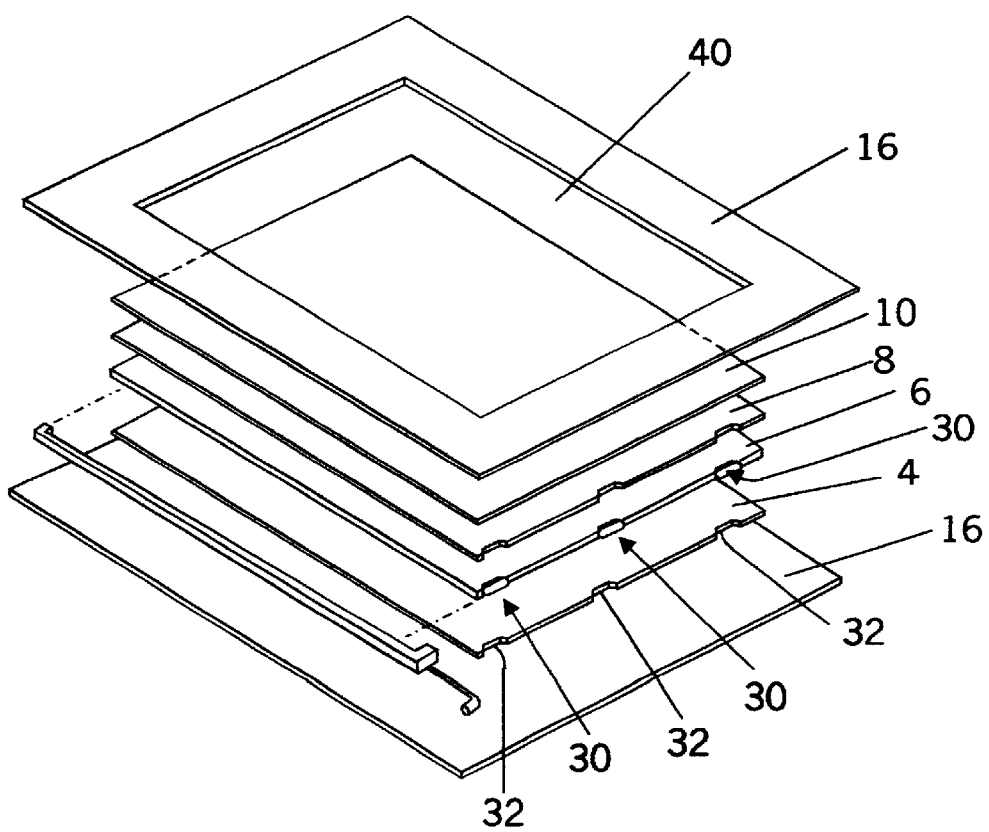
FIG. 7 is a perspective view showing an assembly of parts of a liquid crystal display panel part group of the present invention.
Figure 8:
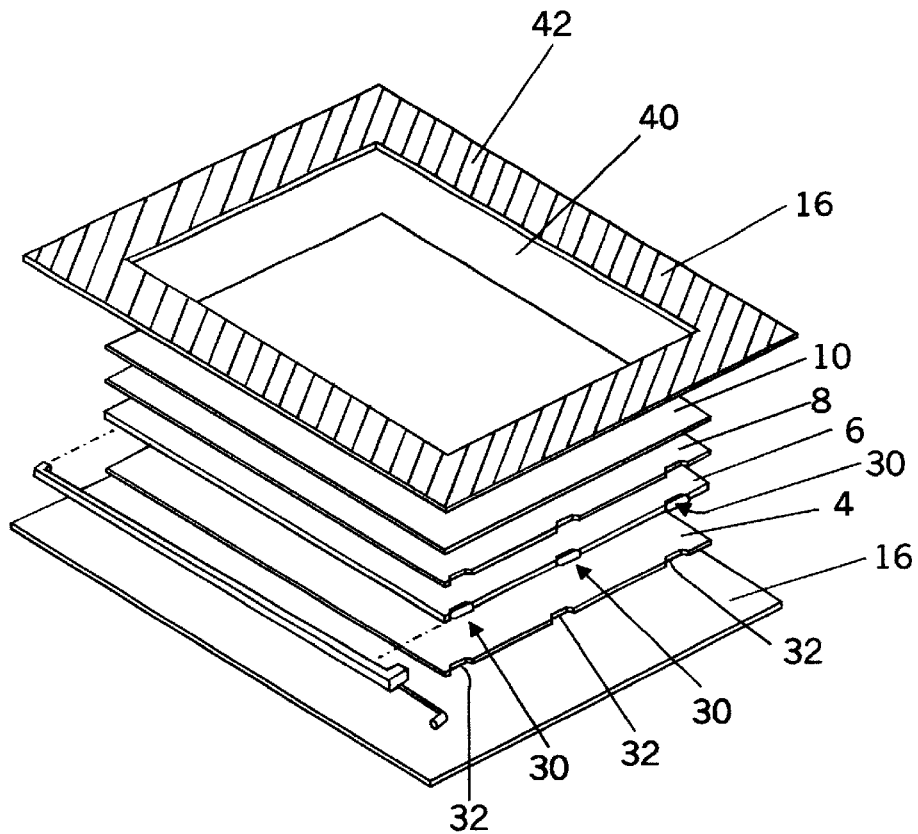
FIG. 8 is a perspective view showing an assembly of parts of a liquid crystal display panel part group of the present invention.

As shown in FIG. 7, an opening or window may be provided at the position corresponding to the display portion of the liquid crystal display panel whereby transmission and reflection of light by the plastic film have no affect on the display portion and deterioration of display colors of the liquid crystal panel is prevented. Since the opening is formed that the position of the plastic film corresponding to the display portion, a plastic film may be used regardless of its transparency and color. Therefore, either a plastic film having a brilliant surface or a plastic film having a mat-shaped surface is satisfactory. Also, a film other than one formed of plastic can be used such as a metal foil, paper, synthetic paper and the like. Moreover, with a film having an opening at the position corresponding to the image display portion, a light shielding sheet 42 can be used as shown in FIG. 8. Heretofore, with leakage of light from an end portion of the light guide plate, an outer periphery portion of the image on the liquid crystal display panel is occasionally brighter than needed. In order to prevent this, a tape possessing a light shielding property is attached to the outer periphery of the panel. By using a light shielding film having the opening at the position corresponding to the display portion as the film of the present invention, it is possible to have the sheet for fixing the liquid crystal display panel part group serve as the light shielding sheet. For the light shielding function, a metal foil such as an aluminum foil, colored plastic film, paper or synthetic paper with black pigment can be used.

As described above, the opening of the plastic film may be on the front side of the liquid crystal display panel, the back side thereof and both sides thereof. Alternately, the opening may be at the position corresponding to the end surface of the liquid crystal display panel part group. In order to perform the lamination in the case where the large openings are formed in both plastic films, the above described method in which two plastic films are adhered in their front and back surfaces may be adopted. Also, a tape-shaped plastic film that is adhered to the liquid crystal display panel part group so as to go around the outer periphery of the end surface thereof group may be used. A plastic film possessing a light shielding property may be employed as the tape-shaped plastic film.

Figure 9:
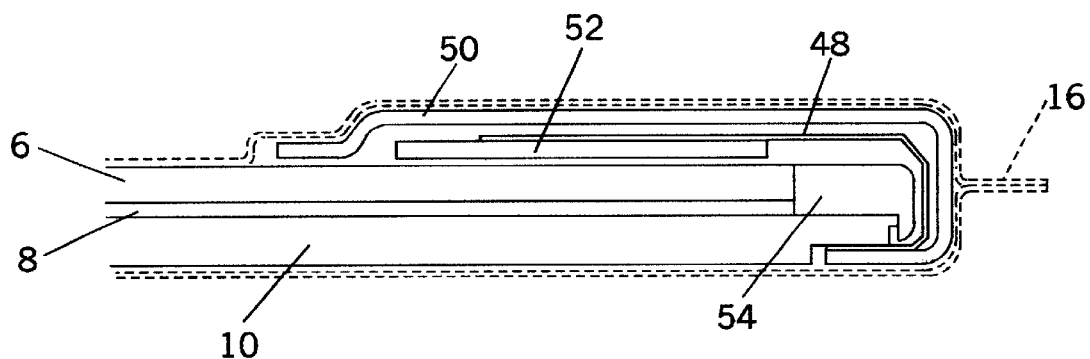
FIG. 9 is a sectional view showing a laminated liquid crystal display panel.

When the plastic film is laminated, many portions of the liquid crystal display panel part group are applied using high pressure and high temperature. Therefore, countermeasures should be taken to cope with that situation. For example, many parts and wires are provided in the TAB 48, and application of localized excessive pressure and temperature to the TAB 48 cannot be avoided. To prevent damage, protection plate 50 as shown in FIG. 9 is provided. By interposing the protection plate between the plastic film and the TAB 48, it is possible to prevent the TAB 48 from being heated to a high temperature due to a heat conduction. Moreover, pressure applied to the entire of the flat protection plate is dispersed so that no localized pressure is applied to the TAB 48 and the plastic film can be successfully laminated with a satisfactory adhesion strength. The protection plate 50 may be made using metals, ceramics, and heat-resistance plastic films. Moreover, in order to avoid influences of unevenness of the TAB, the surface of the protection plate facing the TAB may be previously formed to be uneven or it may be previously subjected to various kinds of coating treatments.

In addition to laminating all of the parts of the liquid crystal display panel part group are laminated, selected parts may be laminated. For example, the lamp, the lamp reflector, the light guide plate, and the optical sheet can be laminated and then this aggregation treated as the backlight unit. Also, the light guide plate and the reflector may be combined to form a set. Moreover, the parts arbitrarily selected among the liquid crystal display panel part group can be laminated. Other parts not described in the specification can also be laminated.

Figure 10:
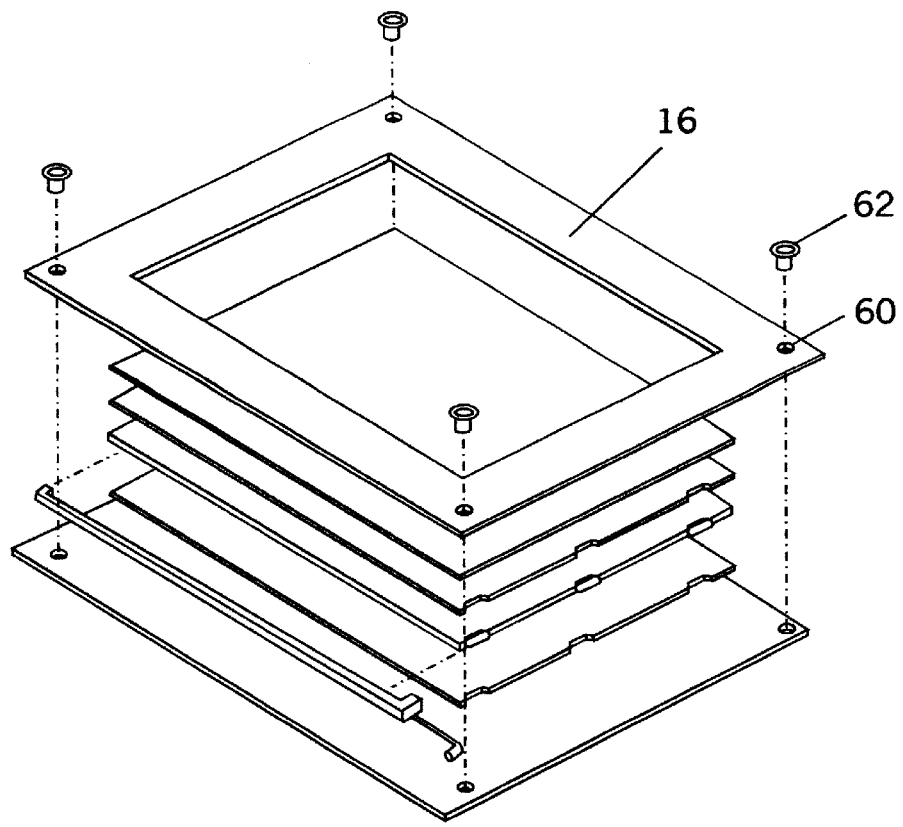
FIG. 10 is a perspective view showing an assembly of parts of a liquid crystal display panel part group of the present invention.
Figure 11:
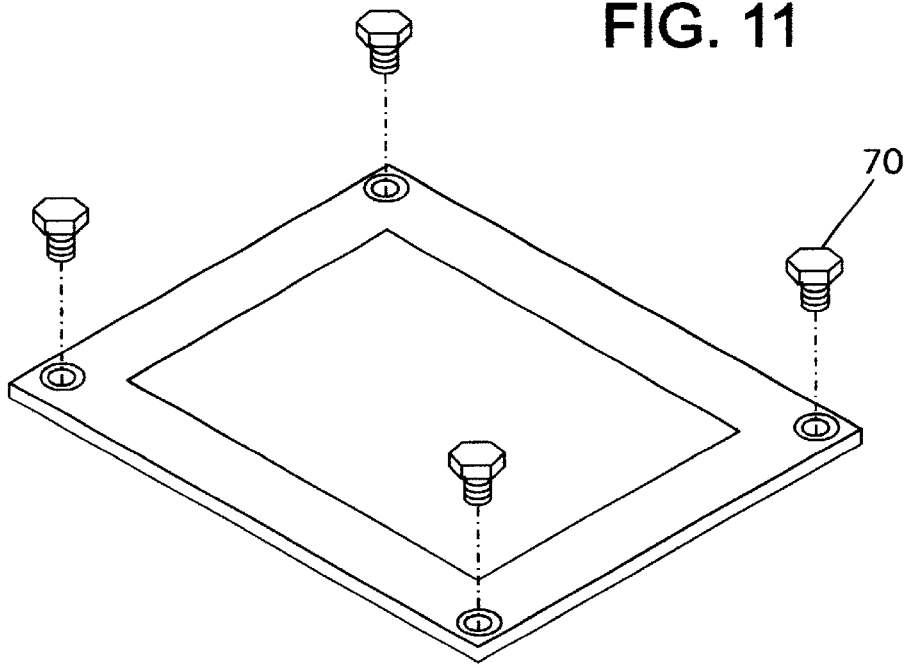
FIG. 11 is a perspective view showing an assembly of parts of a liquid crystal display panel part group of the present invention.

A liquid crystal display panel for a notebook type computer fits on the inside surface of the upper cover of the computer. To fix the liquid crystal display panel part group, projection portions having screw holes were provided in a plurality of spots at the outer periphery of the frame to fix the frame to the liquid crystal display device by a screw. Since the liquid crystal display panel of the present invention has a structure in which the frame is omitted from the parts of the liquid crystal display panel part group and the whole of the liquid crystal display panel part group is laminated by the plastic film, it is difficult to adopt this method of attachment. Instead, when the plastic films 16 are adhered to each other so as to form an overlap, the via holes 60 are formed in the overlap width portion of the plastic film 16 as shown in FIG. 10. Vias 62 are then driven in the via holes 60, whereby the plastic film 16 can be fixed to the liquid crystal display panel unit by the screw 70 as shown in FIG. 11. Since the formation of the via hole 60 in the plastic film 16 may be performed either before the lamination or after it, a degree of freedom for the position of the holes is possible. It should be noted that this via can be used also as means for grounding. As another method, a slit capable of putting the overlap width in the liquid crystal display panel unit is provided and the liquid crystal display panel unit can be fixed by putting the overlap width in the slit. On the other hand, in the case where the plastic film is adhered so as not to form the overlap width screw holes are formed in each part of the liquid crystal display panel part group in order that they serve as a through hole when the parts are integrated. Alternately, for example, a projecting portion having a screw hole is provided in an outer periphery of the light guide plate, and the liquid crystal display panel is fixed to the liquid crystal display device unit by a screw after the lamination. In this case, a hole for a screw may be formed in the plastic film or the hole may be formed in the plastic film after the lamination.

Above we have described a number of embodiments of the present invention. A number of modifications and improvements may be made in these embodiments by those skilled in the art. Therefore, it should be understood that the scope of the invention is not limited to the described embodiments but encompasses the scope and spirit of the appended claims.

We claim:

1. A liquid crystal display panel comprising:
   a liquid crystal display panel part group composed of stack of a plurality of liquid crystal display panel parts; and
   a thin flexible plastic film envelope with an opening which envelope is wrapped around the display panel group is laminated onto exposed surface of top and bottom parts in the stack of the parts of said liquid crystal display panel part group to hold the stack of parts together during use in an operating liquid crystal display wherein said plurality of liquid crystal display panel parts comprise an array cell, an optical system sheet family, a light guide plate, a lamp reflector and a lamp.

2. The liquid crystal display panel according to claim 1, wherein said film is laminated on said liquid crystal display panel part group entirely.

3. The liquid crystal display panel according to claim 1, wherein said opening is provided at a position corresponding to an image display portion of said liquid crystal display panel.

4. The liquid crystal display panel according to claim 3, wherein said film is a light shielding film.

5. The liquid crystal display panel according to claim 1, wherein said opening is an opening for supplying a power source, a ground and an electric signal between said liquid crystal display panel part group and an outside thereof.

6. The liquid crystal display panel according to claim 1, wherein said liquid crystal display panel part group further comprises a protection plate.

7. The liquid crystal display panel according to claim 1, wherein said liquid crystal display panel group has a through hole.

8. The liquid crystal display panel according to claim 7, wherein said through hole is provided at a position of the film corresponding to a periphery of said liquid crystal display panel part group.

9. The liquid crystal display panel according to claim 1, wherein at least more than part among said plurality of the liquid crystal display panel parts have a positioning portion.

10. The liquid crystal display panel according to claim 9, said liquid crystal display panel further comprising positioning parts that mate with the positioning portion to hold the panel parts together, aligned with their operative positions.

11. The liquid crystal display panel according to claim 10, wherein said film is a plastic film.

12. The liquid crystal display panel of claim 10, wherein the position portions are notches in at least two of the liquid crystal display parts and the mating positioning portions are tabs attached to a liquid crystal display part between the two liquid crystal display parts.

13. The liquid crystal display panel of claim 1, wherein the film possess an adhesive property to laminate the film on the parts.

14. The liquid crystal display panel of claim 13, wherein said film has a stickiness either at room temperature or in a state where it melts by heating.

15. A liquid crystal display device comprising:
   a liquid crystal display panel part group stack including a plurality of liquid crystal display panel parts one of which is an array cell;
   a film pouch enveloping the liquid display panel part group within the enclosure and laminated to opposite sides of said liquid crystal display panel part group stack including the array cell to hold the parts of the liquid crystal display part group together in their operable configuration which laminated film pouch has an opening for viewing a display surface of the array cell; and
   a computer unit cover.

16. The liquid crystal display device according to claim 15, wherein said film is screwed to said unit cover.

17. The liquid crystal display device according to claim 15, wherein said plurality of liquid crystal display panel parts in said group includes an optical system sheet family, a light guide plate, a lamp reflector and a lamp.

18. The liquid crystal display device of claim 15, including the liquid crystal pouch having tabs containing holes for attachment to the computer unit cover.

19. A liquid crystal display panel comprising:

a liquid crystal display panel part group composed of a stack of a plurality of liquid crystal display panel parts wherein said plurality of liquid crystal display panel parts includes an array cell, an optical system sheet family, a light guide plate, a lamp reflector; an element containing parts and wires and a lamp; and a film pouch enveloping all the parts of the stack of said liquid crystal display panel part group and adhering to opposite exposed surfaces at the back and front of the stack of the end parts of the group to hold the parts of the group together during use in a display unit.

20. The liquid crystal display panel according to claim 19, wherein said film pouch is made of a light shielding film and has an opening therein aligned with the image display portion of the liquid crystal display panel.

21. The liquid crystal display panel according to claim 20, wherein said pouch has a second opening for supplying a power ground and electric signal connections between said liquid crystal display panel part group in the pouch and the outside thereof.

22. The liquid crystal display panel according to claim 21, wherein said liquid crystal display panel group and the pouch have through holes to attach the group the rest of the display unit.

23. The liquid crystal display panel according to claim 22, wherein among said plurality of the liquid crystal display panel parts have positioning portions for alignment of the parts in their operative positions prior to their being held in place by adherence to the pouch.

24. The liquid crystal display panel of claim 23 including a peripheral metal protection plate between the element containing parts and wires and the plastic pouch to disperse heat and pressure to protect the element.

\* \* \* \* \*